May 14, 1957 A. R. BIEDESS 2,792,104
DRIVE FOR BELT CONVEYORS
Original Filed April 21, 1953 7 Sheets-Sheet 4

Inventor
Anthony R. Biedess
By Murray A. Gleeson
Attorney.

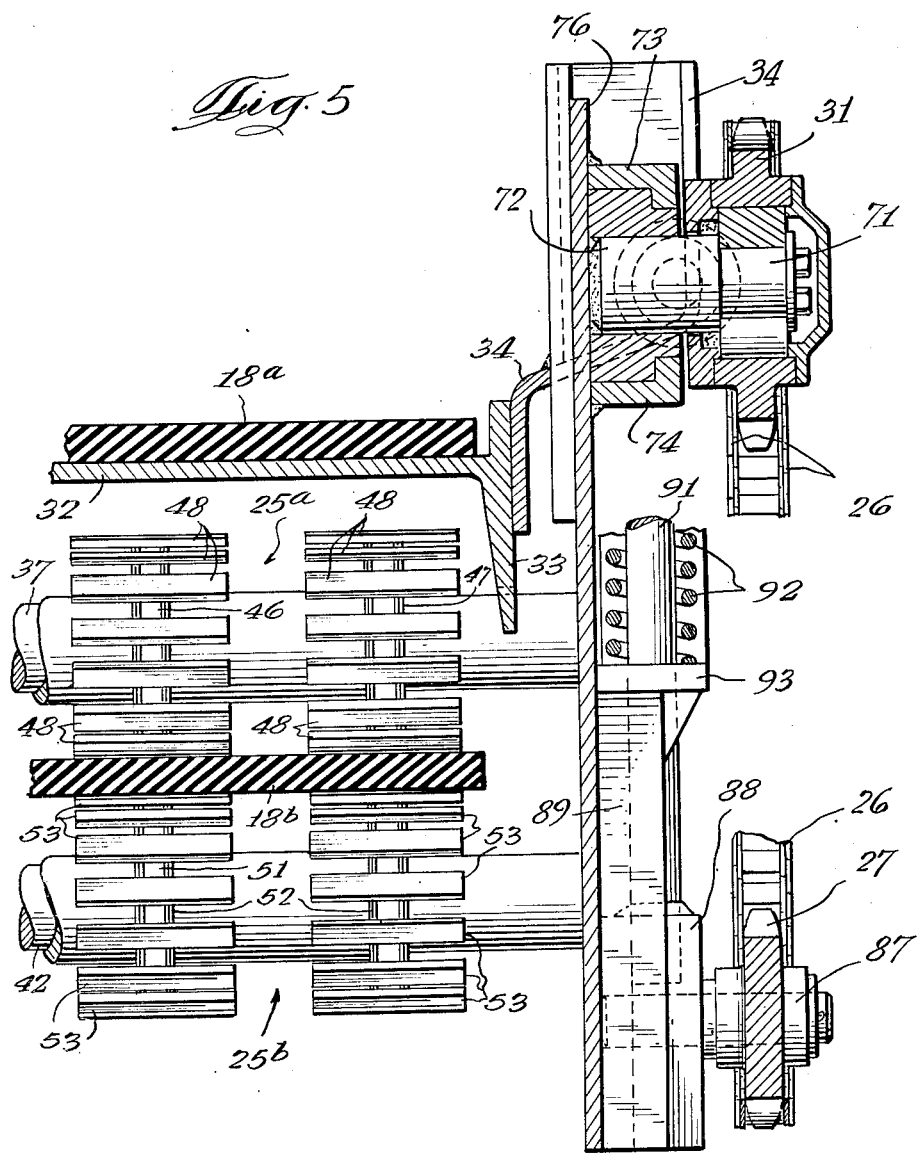

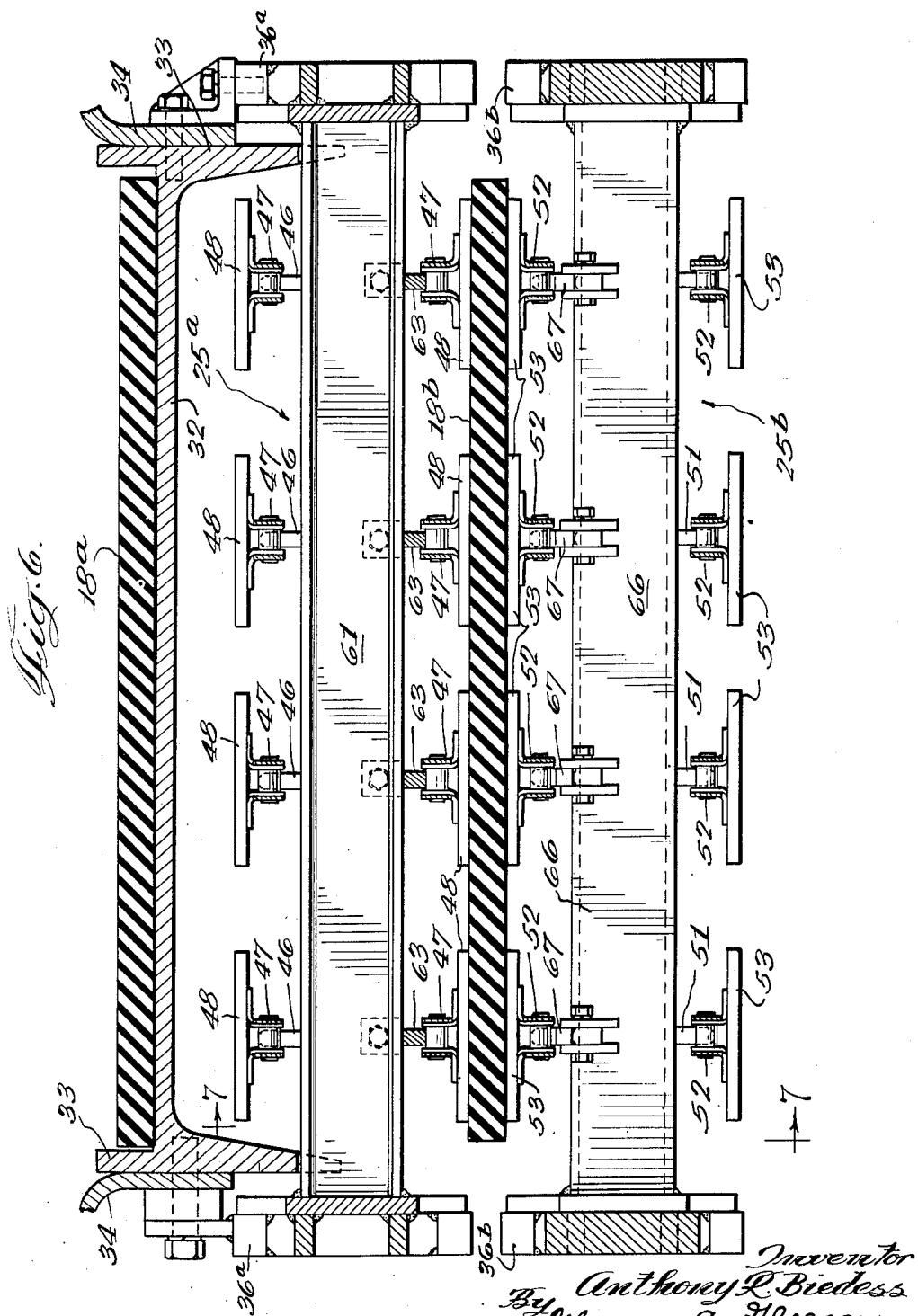

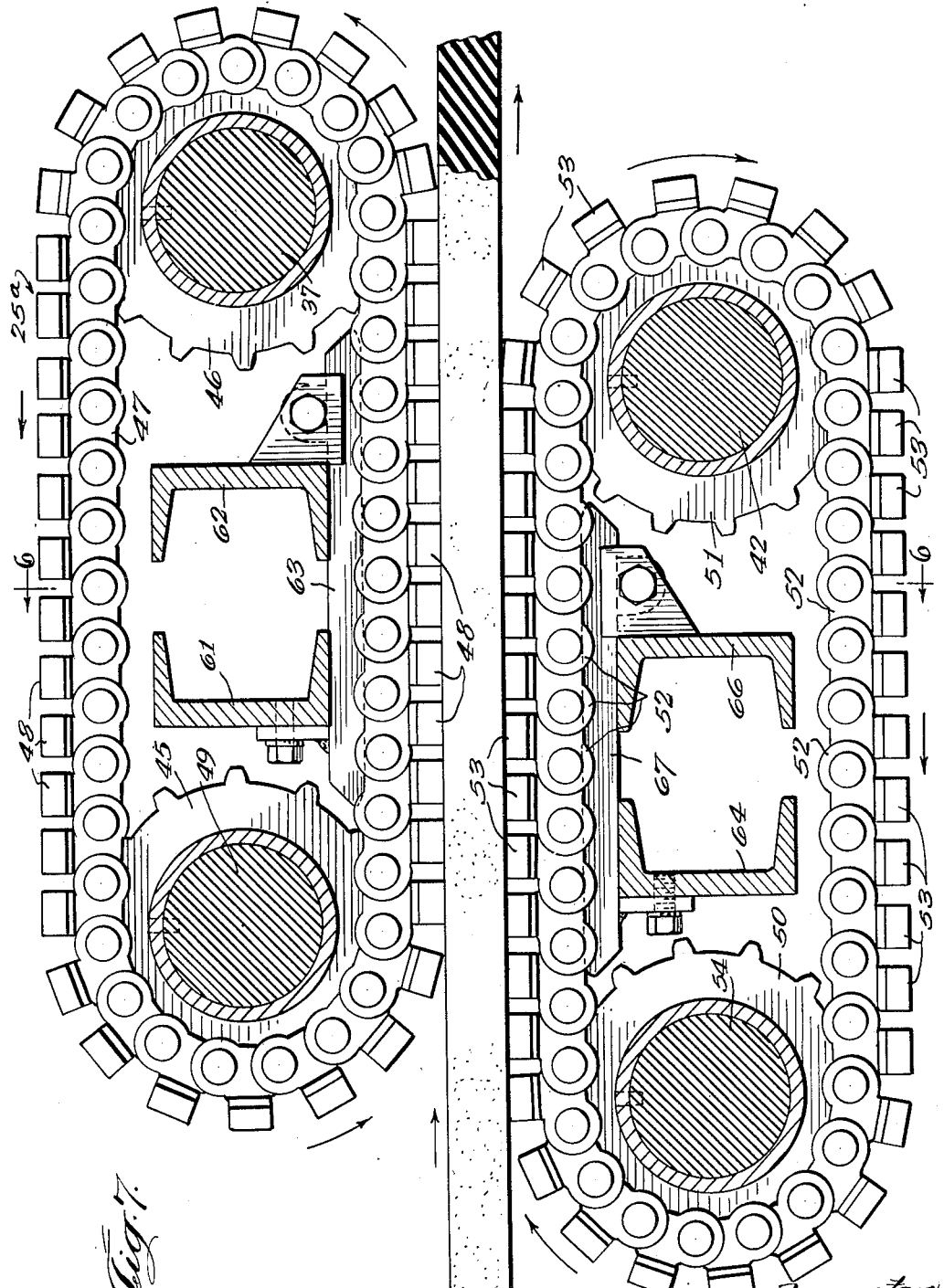

United States Patent Office 2,792,104
Patented May 14, 1957

2,792,104

DRIVE FOR BELT CONVEYORS

Anthony R. Biedess, Chicago, Ill., assignor to Goodman Manufacturing Company, Chicago, Ill., a corporation of Illinois Continuation of application Serial No. 350,067, April 21, 1953. This application January 5, 1956, Serial No. 557,561

15 Claims. (Cl. 198—203)

This invention relates generally to belt conveyors and more particularly to improvements in driving mechanisms for such conveyors.

This application is a continuation of my application Ser. No. 350,067, filed April 21, 1953 for Drive for Belt Conveyors and now abandoned.

In the usual types of belt conveyors the conveyor belt is trained around a pair of pulleys, one being driven by a suitable prime mover, and the other functioning as an idler pulley. The effective pull on the belt is the difference in tension between the taut or conveying reach thereof and the slack or return reach thereof. In order to give the proper degree of tautness to the conveying reach and to limit the slippage on the driving pulley it is customary to provide tensioning idlers. However, such devices cause an inordinate requirement for power merely to provide such tautness and to limit the amount of slippage on the driving pulley.

According to the present invention the need for a driving roller is eliminated, the belt being driven along one of the reaches thereof by endless gripper belts disposed above and below such reach. Each gripper belt is trained around a pair of sprockets which maintain substantially fixed distances apart, and corresponding sprockets of each gripper belt are connected by links providing for shifting of one pair of sprockets and their associated gripper belt in a direction substantially tangentially of the gripped reach, but also in a direction normal to the plane of such reach, so as to vary the grip of the gripper belts in accordance with the load on the conveyor belt.

The driving sprockets of such gripper belts are driven by a sprocket having a driving chain trained therearound, the pull on such chain tending at all times to move the gripper belts toward each other, more firmly to engage the reach therebetween, thereby automatically correcting for increased loads on the conveyor belt.

The driving chain trained around such driving sprocket is also arranged to be trained around an idler sprocket mounted on a stub shaft which maintains its center fixed in position as long as the pull on the chain is less than a predetermined amount. The pull on the driving chain tends during normal loads on the conveyor belt to apply a torque causing the gripper belts to grip the reach with a force according to such load. However, when the load on the conveyor reaches a value which could cause damage to the gripper belts the stub shaft is arranged to move under the increased pull in the driving chain in a direction to remove such torque or at least to correct same.

With the foregoing considerations in mind it is a principal object of this invention to provide an improved arrangement for driving the belt of a belt conveyor.

Another object is to provide an improved belt conveyor characterized by gripper belts for driving one of the reaches of the belt, which gripper belts at all times complement each other in accordance with the load on the belt.

Another important object is to provide an improved conveyor drive characterized by the provision of an arrangement which will automatically prevent overloading of the gripper belt drives.

Other objects and important features of the invention will be apparent from a study of the specification following taken with the drawings which together show a preferred embodiment of the invention and what is now considered to be the best mode of practicing the principles thereof. Other embodiments of the invention may be suggested to those having the benefit of the teachings herein, and it is therefore intended that the scope of the invention not be limited by the precise embodiment shown herein, the scope thereof being intended to be limited only by the claims subjoined.

Figure 1:
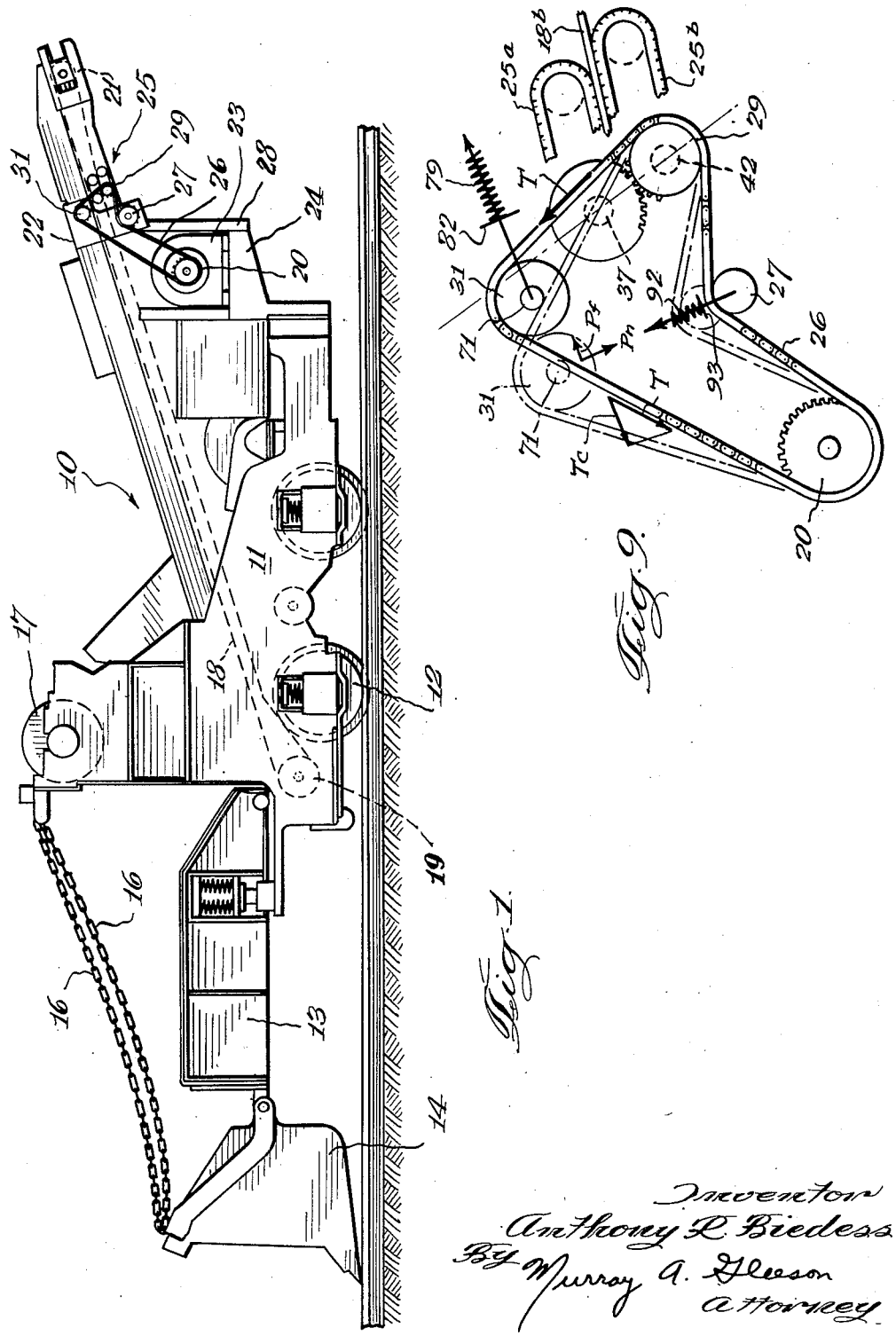
Fig. 1 is an elevation view of a mucking machine having embodied therein an improved conveyor drive mechanism according to the present invention.
Figure 2:
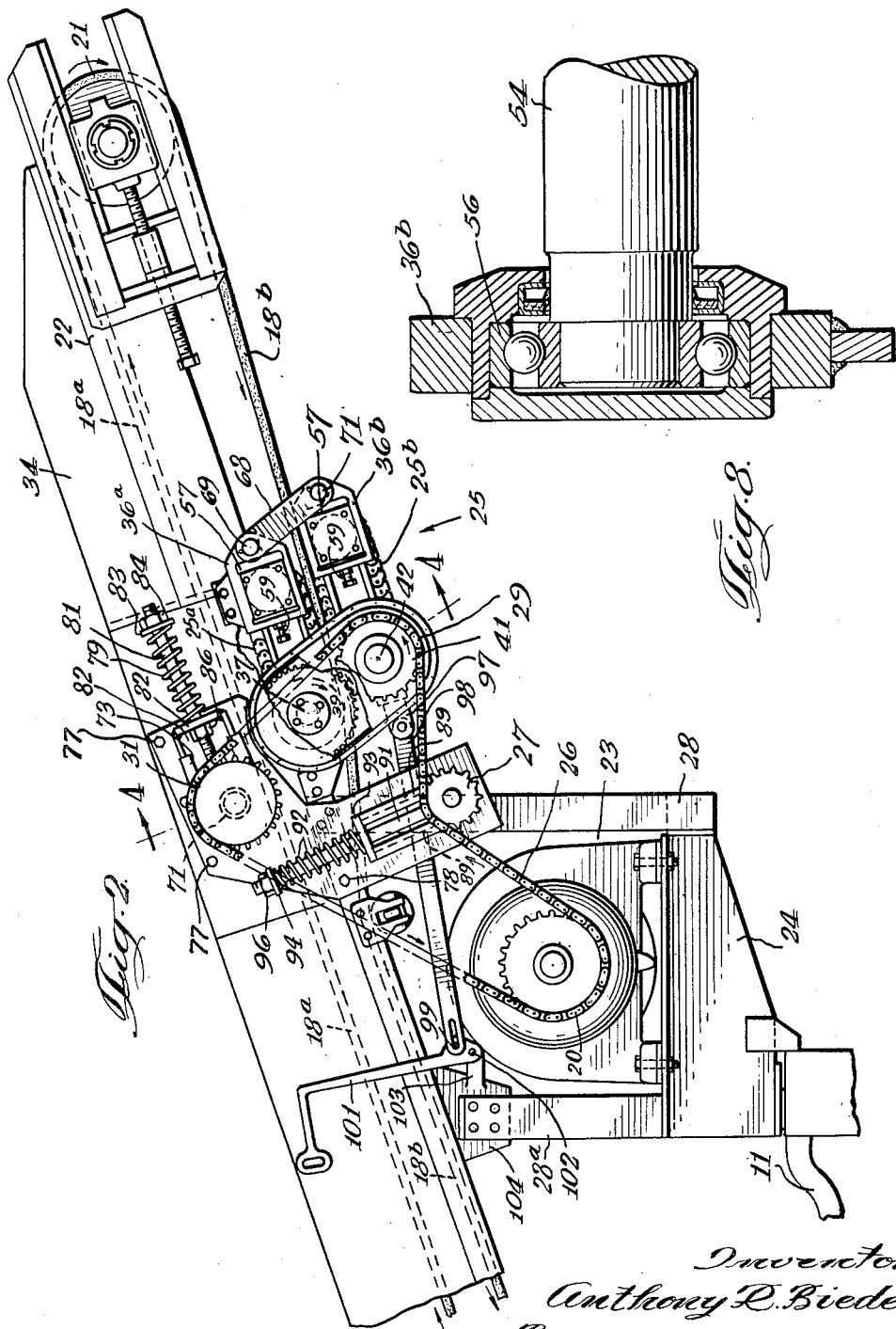
Fig. 2 is an enlarged elevation view of a portion of the conveyor shown in Fig. 1, showing details of the conveyor drive mechanism.
Figure 3:
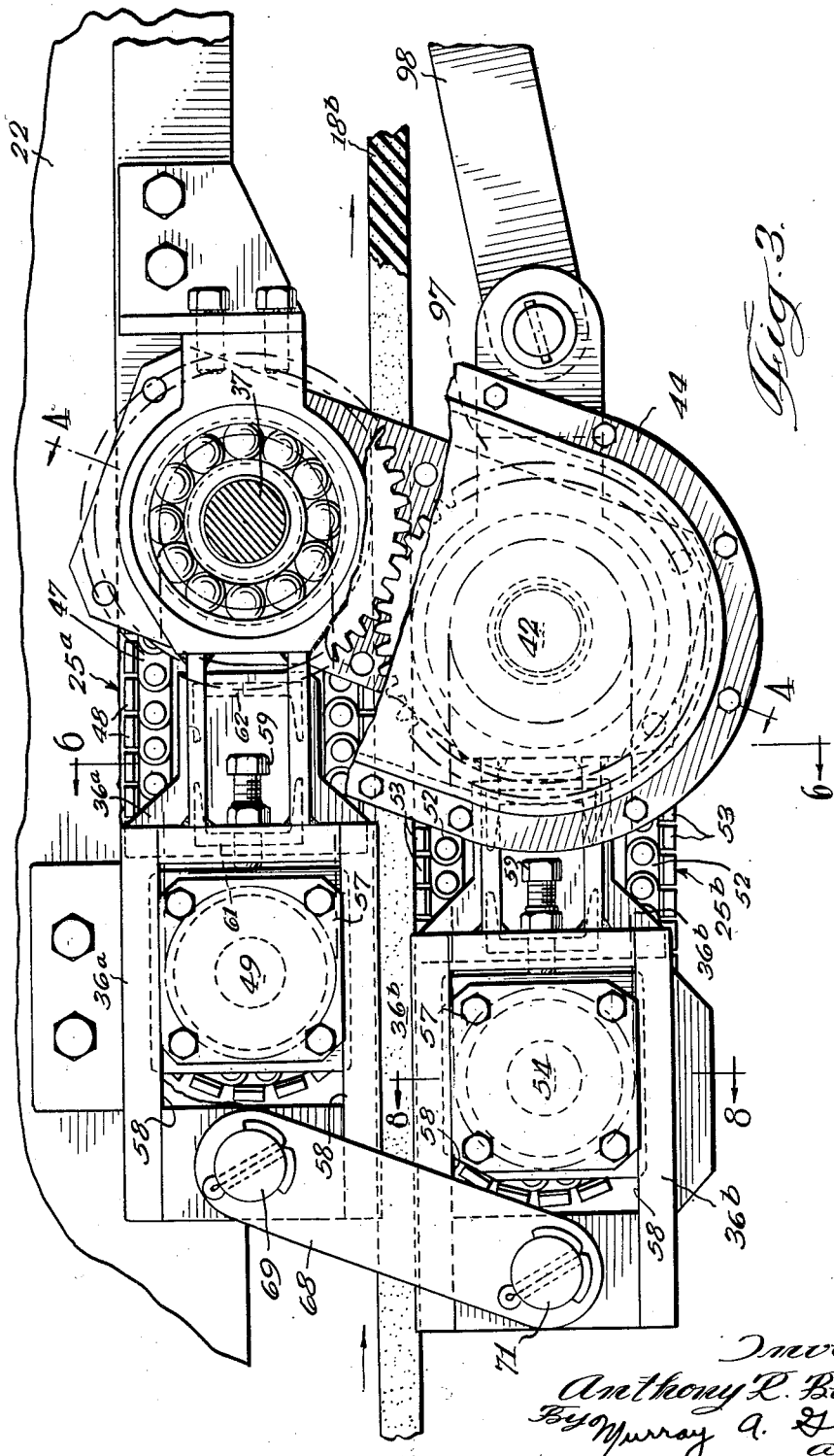
Fig. 3 is an elevation view similar to Fig. 2 but showing the opposite side of the drive mechanism shown in Fig. 2.
Figure 4:
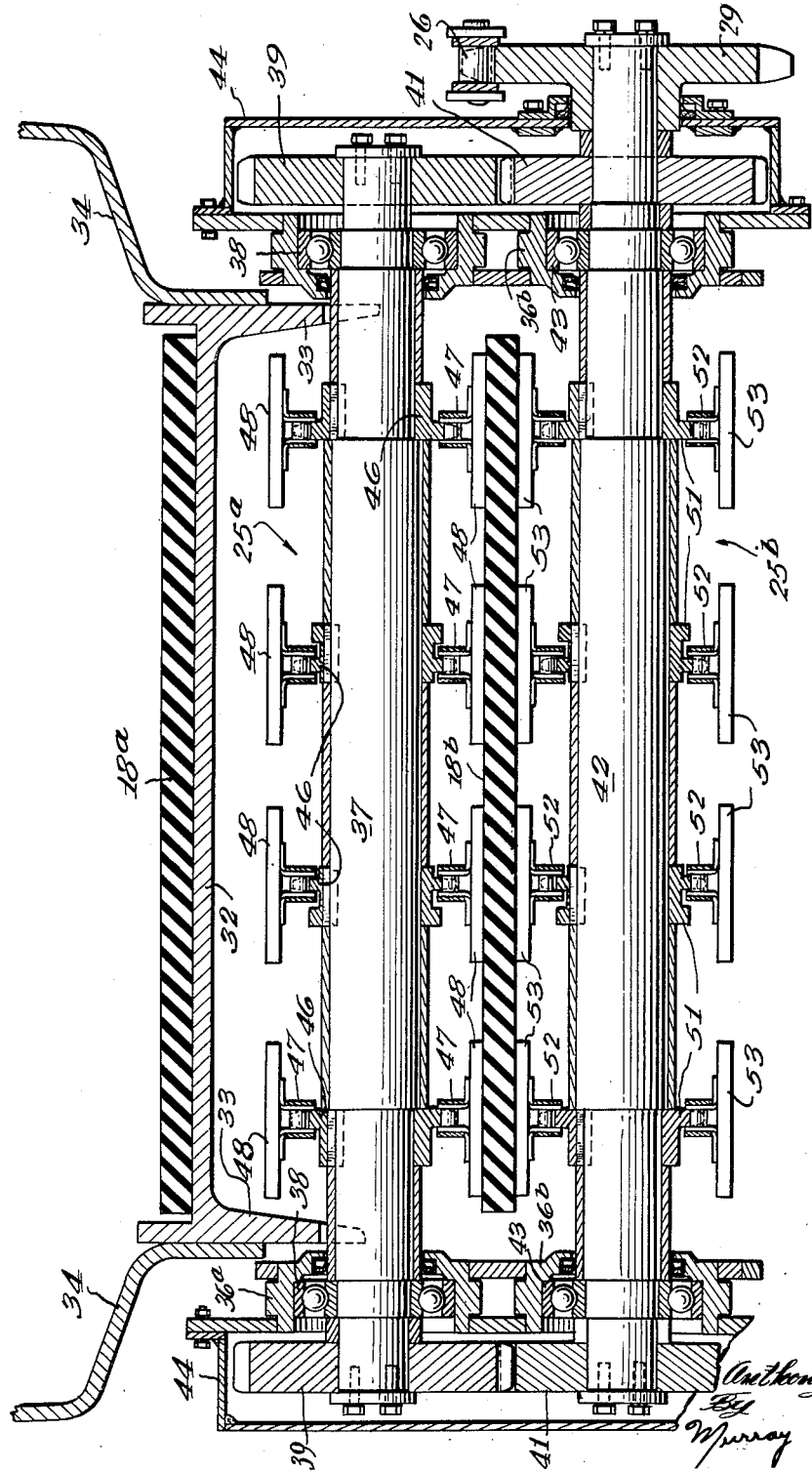

Fig. 4 is a section taken along the line 4—4 of Figs. 2 and 3 looking in the direction of the arrows, showing certain details of the gripper belts for the conveyor belt shown in Figs. 1 and 2;

Fig. 5 is an end view of the structure shown in Fig. 2;

Fig. 6 is a view taken along the plane 6—6 of Fig. 3 looking in the direction of the arrows;

Fig. 7 is a view taken substantially along the line 7—7 of Fig. 6 looking in the direction of the arrows;

Fig. 8 is a sectional view taken along the line 8—8 of Fig. 3 showing certain details of construction of support for the idler shafts of the gripper belts; and Fig. 9 is a schematic view showing the operation of an overloading device preventing damage to the gripper belts.

Referring now particularly to Fig. 1 of the drawings, the improvements according to the present invention are embodied in a mucking machine referred to generally by the reference numeral 10. Said machine includes a main frame 11 mounted for movement upon wheels 12 and affording a support for a boom 13 having pivotally mounted at the end thereof a bucket or scoop 14. Draft means 16 in the form of the chains shown are arranged to be wrapped about a pair of winding drums 17, for lifting movement of the bucket 14, and swinging movement of the boom 13, so that the contents of the bucket 14 may be discharged upon a belt conveyor 18. As seen in Fig. 1, the belt conveyor 18 moves longitudinally of a discharge boom 22, and is trained around a lower idler roller 19 and an idler roller 21 located at the end of the discharge boom 22.

The belt conveyor 18 includes an upper or conveying reach 18a and a lower or return reach 18b. The belt conveyor 18 is driven by an electric motor 23 mounted upon a base or standard 24 extending from the frame 11. The motor 23 supplies power to drive a pair of gripper belts indicated generally by the reference numeral 25, the motor 23 having a sprocket 20 engaging a drive chain 26 trained around an idler sprocket 27 mounted upon a vertical standard 28 which extends from the standard 24 upward to the discharge boom 22, as will be seen more clearly as this specification proceeds. The drive chain 26 also is trained around a driving sprocket 29, see also Fig. 4, to drive the gripper belt mechanisms 25, said drive chain 26 being also trained around an idler sprocket 31, see also Figs. 2 and 5.

Referring now particularly to Figs. 2, 3, 4 and 5 of the drawings the gripper belts 25 consist generally of an upper endless gripper belt mechanism 25a arranged to contact the upper surface of one of the reaches of the belt 18, as for example, the lower reach 18b of the conveyor belt 18, and a lower endless gripper belt 25b arranged to shift with respect to the endless belt 25a and to contact the lower side of the reach 18b of the conveyor belt 18. As will be explained in further detail as this specification proceeds, the shifting of the lower endless gripper belt 25b is accomplished in accordance with the load upon the conveyor belt 18, such shifting of the gripper belt 25b being in the direction more tightly to grip the upper and lower surfaces of the reach 18b.

For purposes of description herein, the drive for the conveyor belt 18 will be had with reference to the return reach 18b, but it will be apparent to those skilled in the art that at times the drive may be had at what is usually considered the conveying reach, i. e., the upper reach. The scope of the invention, then, comprehends driving at either of the reaches.

As seen with particular reference to Figs. 4 and 6, the discharge boom 22 for the belt conveyor 18 consists of an I-beam 32, with its web extending horizontally in the manner shown, and having end flanges 33 to which are affixed flared sides 34. The flanges 33 afford a support for an upper fixed frame 36a of the upper endless gripper belt mechanism 25a and a lower shiftable frame 36b for the lower endless gripper belt mechanism 25b. Upper frame 36a is arranged to provide a support for a drive shaft 37 mounted at each end in a bearing 38 held in the upper frame 36a. A gear 39 is mounted fast to each end of the shaft 37 and meshes with a gear 41 mounted fast to each end of a shaft 42 held at each end in the lower shiftable frame 36b, said shaft being supported upon end bearings 43. Said gears 39 and 41 are enclosed within a housing 44, see also Fig. 2, which is arranged to swivel with respect to the upper frame 36a with the shaft 37 as a turning center, as the lower endless gripper belt 25b shifts with respect to the upper endless gripper belt 25a.

The drive sprocket 29 is fast to the shaft 42 and is arranged to drive the shafts 37 and 42 at the same speed but in opposite directions irrespective of the shift of the lower gripper belt 25b with respect to the upper gripper belt 25a.

As seen with particular reference to Figs. 3, 4 and 6, the upper endless gripper belt mechanism 25a consists of a plurality of sprockets 46 mounted upon the shaft 37 and driving endless chains 47 having gripper pads 48 fastened thereto, the endless chains 47 being also trained around idler sprockets 45 arranged to turn upon an idler shaft 49, see also Fig. 7.

The lower endless gripper belt mechanism 25b consists of sprockets 51 mounted fast upon the shaft 42 and engaging endless chains 52 having gripper pads 53 mounted thereon, the endless chain 52 turning also upon idler sprockets 50 mounted upon a shaft 54, see also Fig. 7. In Fig. 8 there is shown a detail of the support for the idler shaft 54 which is mounted at each end in a bearing 56 held in the lower shiftable frame 36b. Idler shaft 49 is supported in a similar fashion in the upper frame 36a.

The upper frame 36a and the lower shiftable frame 36b are arranged to have shiftable bearing supports 57, for the idler shafts 49 and 54, so that proper tension may be placed upon the endless chains 47 and 52. To this end the upper frame 36a and the lower frame 36b are arranged with spaced surfaces 58, in which the bearing supports 57 are arranged to slide, the position of each bearing 57 being adjusted by means of set screws 59.

Means are provided for supporting the upper reach of the lower gripper belt mechanism 25b so as to maintain the gripper pads 53 in contact with the lower surface of the return reach 18b. The gripper pads 48 of the upper gripper belt 25a is likewise maintained in contact with the upper surface of the return reach 18b. To this end the upper frames 36a are spanned by a pair of channel members 61 and 62, see Fig. 7, which are mounted at their ends in the frames 36a, see Fig. 6. The spaced channel members 61 and 62 support stringers 63 which bear against the endless chains 47. The lower frame 36b likewise supports spaced channel members 64 and 66 secured at their ends to the frame member 36b as seen in Fig. 6. These spaced channels 64 and 66 likewise support stringer members 67 contacting the chain 52, see again Fig. 7.

The upper frames 36a and the lower frames 36b are joined pivotally by links 68 connected at each end by pins 69 and 71 to the upper frame 36a and the lower frame 36b. It will be remembered that the upper frame 36a and the lower frame 36b are also joined by the housing 44, so that the lower frame 36b may shift with respect to the upper frame 36a, the upper and lower frames 36a and 36b, the housing 44 and the links 68 describing a parallelogram shaped structure.

As seen in Figs. 2 and 5, the idler sprocket 31 for the driving chain 26 is mounted upon a pin 70 extending from a block 72 arranged to slide between a pair of guides 73 and 74 extending from a support plate 76. Said support plate 76 is secured by bolts 77 and 78 to the vertical standard 28 and the flared side 34. The sprocket 31 is normally urged to the right and upward as seen in Fig. 2, by a pre-loaded spring 79 encircling a rod 81 threaded into the block 72, one end of the spring 79 being bottomed upon a yoke 82 connected to guides 73 and 74, the other end of the spring 79 being bottomed against a washer 83 held in position by a nut 84 threaded to the rod 81. A nut 86 also threaded to the rod 81 limits the movement of the sprocket 31 to the right, as seen in Fig. 2, by contact with the yoke 82.

The idler sprocket 27 is mounted in a fashion similar to the sprocket 31. The sprocket 27 is free to turn upon a stub shaft 87 extending from a block 88 guided between a pair of guides 89. A rod 91 extends from the block 88 and is encircled by a spring 92 bottomed at one end upon a yoke 93 formed as part of the guide 89, the other end of the spring 92 being bottomed against a washer 94 held in position by a nut 96 threaded to the end of the rod 91. Normally, the load in the drive chain 26 is such as to tend to move the idler sprocket 27 downward and to the right slightly as seen in Fig. 2, the amount of such movement being restrained by the spring 92.

Consider the condition obtaining when it is desired to drive the conveyor belt 18 at the lower reach 18b thereof. When power is supplied to the drive motor 23, the drive chain 26 will drive the sprocket 29 in a counter-clockwise direction as seen in Fig. 2. The gear 41 which is driven by the sprocket 29 tends to travel in an orbital path with shaft 37 as a center, the gear 41 having for its reaction point the teeth of the gear 39. Such movement will shift the lower frame 36b and move the gripper pads 53 into firmer contact with the lower surface of the return reach 18b.

The shifting effect of the lower frame 36b tends always, of course, to be in a direction to grip the return reach 18b with ever-increasing force, and such increase in force is of course manifested by increase in tension upon the driving chain 26. Such increase in tension in excess of a predetermined amount will, of course, cause the idler sprocket 31 to move with its support block 72 against the force in the spring 79. The movement of the idler sprocket 31 against the force of the spring 79 tends to decrease the length of the moment arm of the chain 26 about the center line of the shaft 37, thereby tending at the same time to correct the excess of frictional engagement with the return reach of the conveyor belt 18.

The spring 79 cooperates with the idler sprocket 31 in such a fashion that the pull T on the chain 26 in excess of a predetermined value creates a component of force $T_c$ overcoming the pre-load of the spring 79. The block 72 thus moves with the stub shaft 70 and pulley 31 in a direction downward and to the left as seen in Fig. 9.

In so doing, the path of travel of the chain 26 from sprocket 29 to sprocket 31 is changed so as to reduce the length of the moment arm of the chain about the centerline of the shaft 37. Under conditions of extreme tension upon the chain 26 such moment arm may be decreased to zero, the path of the chain 26 being coincident with the center of the shaft 37.

If the tension upon the drive chain 26 increases even more, the path of the chain 26 may move past the center of the shaft 37, that is to say, to the left thereof. Under such condition, the moment created by the chain 26 would be such as to cause the sprocket 29 to revolve orbitally in a clockwise direction with respect to the shaft 37, thereby releasing engagement of the gripper belts 25a and 25b with the return reach 18b.

The tension in the chain 26 also creates a force component $P_n$ normal to the guide 74 for the block 72. Movement of the block 72 in the guideways 73 and 74 is of course restrained by the frictional force component of the block 72 on the guideway, which force component is denoted $P_f$. The direction of such component is such as to oppose movement of the block 72, thereby augmenting the action of the spring 79. The size of the spring 79 is thereby not required to be as large.

It will be seen that by such arrangement of the sprocket 31 and the spring 79 the belt 18 will be prevented from being torn up or the motor 23 from being burned out.

Means are provided for releasing the engagement of the upper and lower gripper belts 25a and 25b, and to this end the housing 44 has a lug 97 extending therefrom to which is hingedly connected an actuator rod 98, hingedly connected in turn as at 99 to an operating lever 101. The lever 101 has a pin connection 102 to a fixed abutment 103 extending from a gusset plate 104 connecting the discharge boom 22 with vertical standard 28a. It will be seen that rocking of the lever 101 in a counterclockwise direction causes the housing 44 to shift in a clockwise direction thereby disengaging the lower endless gripper mechanism 25b from contact with the return reach 18b.

From the description foregoing it will be apparent that there has been provided a new and useful mechanism for driving a belt conveyor. It will be apparent that none of the power from the motor 23 will be wasted to effect proper tensioning of the belt 18 as would be the case where a driving pulley and an idler pulley are employed.

As is known to those skilled in the art, the presence of foreign material between the belt and the driving pulley always affects adversely the operation thereof. In the driving mechanism according to the present invention the belt is always driven at a plurality of points and along only a part of the surface thereof so that the presence of dirt will not affect the operation of the gripper pads of the several endless gripper belts.

While the invention has been described with reference to a gripper belt driving mechanism which extends for the width of the conveyor belt and is arranged to drive at the return reach, it will be evident that the mechanism may be arranged to drive at the edges of the belt with the center part thereof free for movement of material. Likewise, such latter form of the invention may be operated equally as well at what is usually considered the upper, or conveying reach.

While the invention has been described in terms of a preferred embodiment thereof, it is not intended that the invention be limited by the precise embodiment herein shown, nor otherwise than by the terms of the claims appended.

I claim as my invention:

1. Belt driving means for a belt conveyor having a conveying reach and a return reach comprising a pair of endless gripper devices contacting oposite surfaces of one of said reaches, each of said gripper devices having spaced driving and idler means so as to provide an area of contact between said endless gripper devices and the aforesaid reach, a linkage connecting said endless gripper devices for shifting of one of said gripper devices with respect to the other, means for driving said endles gripper devices comprising a driving member turning with the driving means of said shiftable gripper device, a flexible strand trained around said driving meember, a relatively fixed guide for said flexible strand, the coaction of said flexible strand with said driving member creating a moment around the driving means of the other of said gripper devices for moving said shiftable gripper device in a direction to increase the frictional engagement of said gripper devices in accordance with the load on said belt conveyor, and pre-loaded spring means for opposing movement of said relatively fixed guide until the tension on said flexible strand reaches a predetermined value thereby limiting the frictional engagement of said gripper devices with the aforesaid reach.

2. Belt driving means for a belt conveyor having a conveying reach and a return reach comprising a pair of endless gripper devices contacting opposite surfaces of one of said reaches, each of said gripper devices having spaced driving and idler means so as to provide an area of contact between said endless gripper devices and the aforesaid reach, a linkage connecting said endless gripper devices for shifting of one of said gripper devices with respect to the other, means for driving said endless gripper devices comprising a driving member turning with the driving means of said shiftable gripper device, a flexible strand trained around said driving member, a relatively fixed guide for said flexible strand, the coaction of said flexible strand with said driving member creating a moment around the driving means of the other of said gripper devices for moving said shiftable gripper device in a direction to increase the frictional engagement of said gripper devices in accordance with the load on said belt conveyor, and spring means for opposing movement of said relatively fixed guide until the tension on said flexible strand reaches a predetermined value thereby limiting the frictional engagement of said gripper devices with the aforesaid reach, the increase in tension of said flexible strand beyond said predetermined amount causing said relatively fixed guide to move in a direction against the load in said spring to decrease the moment created by said flexible strand.

3. Belt driving means for a belt conveyor having a conveying reach and a return reach comprising a pair of endless gripper devices contacting opposite surfaces of one of said reaches, each of said gripper devices having spaced driving and idler means so as to provide an area of contact between said endless gripper devices and the aforesaid reach, a linkage connecting said endless gripper devices for shifting of one of said gripper devices with respect to the other, means for driving said endless gripper devices comprising a driving member turning with the driving means of said shiftable gripper device, a flexible strand trained around said driving member, a guide for said flexible strand, the coaction of said flexible strand with said driving member creating a moment around the driving means of the other of said gripper devices for moving said shiftable gripper device in a direction to increase the frictional engagement of said gripper devices in accordance with the load on said belt conveyor, and pre-loaded spring means for opposing movement of said guide until the tension on said flexible strand reaches a predetermined value thereby limiting the frictional engagement of said gripper devices with the aforesaid reach, the increase in tension of said flexible strand beyond said predetermined amount causing said guide to move in a direction against the load in said spring to decrease the moment created by said flexible strand, and to decrease the frictional engagement of said gripper devices.

4. Belt driving means for a belt conveyor having a conveying reach and a return reach comprising a pair of endless gripper devices contacting opposite surfaces of one of said reaches, each of said gripper devices having spaced driving and idler means so as to provide an area of contact between said endless gripper devices and the aforesaid reach, a linkage connecting said endless gripper devices for shifting of one of said gripper devices with respect to the other, means for driving said endless gripper devices comprising a driving member turning with the driving means of said shiftable gripper device, a flexible strand trained around said driving member, a guide for said flexible strand, the coaction of said flexible strand with said driving member creating a moment around the driving means of the other of said gripper devices for moving said shiftable gripper device in a direction to increase the frictional engagement of said gripper devices in acordance with the load on said belt conveyor, and spring means for opposing movement of said guide until the tension on said flexible strand reaches a predetermined value thereby limiting the frictional engagement of said gripper devices with the aforesaid reach.

5. Belt driving means for a belt conveyor having a conveying reach and a return reach comprising a pair of endless gripper devices contacting opposite surfaces of one of said reaches, each of said gripper devices having spaced driving and idler means so as to provide an area of contact between said endless gripper device and the aforesaid reach, a linkage connecting said endless gripper devices for shifting of one of said gripper devices with respect to the other, and means for driving said endless gripper devices comprising a driving member turning with the driving means of said shiftable gripper device, a flexible strand trained around said driving member, a relatively fixed guide for said flexible strand, the coaction of said flexible strand with said driving member creating a moment around the driving means of the other of said gripper devices for moving said shiftable gripper device in a direction to increase the friction engagement of said gripper devices in accordance with the load on said belt conveyor.

6. Belt driving means for a belt conveyor having a conveying reach and a return reach comprising a pair of endless gripper devices contacting opposite surfaces of one of said reaches, each of said gripper devices having spaced driving and idler means so as to provide an area of contact between said endless gripper device and the aforesaid reach, a linkage connecting said endless gripper devices for shifting of one of said gripper devices with respect to the other, means for driving said endless gripper devices comprising a driving member turning with the driving means of said shiftable gripper device, a flexible strand trained around said driving member, a relatively fixed guide for said flexible strand, the coaction of said flexible strand with said driving member creating a moment around the driving means of the other of said gripper device in a direction to increase the frictional engagement of said gripper devices in accordance with the load on said belt conveyor, and spring means for opposing movement of said relatively fixed guide until the tension on said flexible strand reaches a predetermined value, thereby limiting the frictional engagement of said gripper devices with the aforesaid reach.

7. Belt driving means for a belt conveyor having a conveying reach and a return reach comprising a pair of endless gripper devices contacting opposite surfaces of one of said reaches, each of said gripper devices having spaced driving and idler means so as to provide an area of contact between said endless gripper device and the aforesaid reach, a linkage connecting said endless gripper devices for shifting of one of said gripper devices with respect to the other, and means for driving said endless gripper devices comprising a driving member turning with the driving means of said shiftable gripper device, a flexible strand trained around said driving member, a guide for said flexible strand, the coaction of said flexible strand with said driving member creating a moment around the driving means of the other of said gripper devices for moving said shiftable gripper device in a direction to increase the frictional engagement of said gripper devices in accordance with the load on said belt conveyor, and spring means for opposing movement of said guide until the tension on said flexible strand reaches a predetermined value, the increase in tension on said flexible strand beyond said predetermined amount causing said guide to move in a direction against the load in said spring to decrease the moment created by said flexible strand, and to decrease the frictional engagement of said gripper devices.

8. Belt driving means for a belt conveyor having a conveying reach and a return reach comprising a pair of endless gripper devices contacting opposite surfaces of one of said reaches, each of said endless gripper devices having spaced driving and idler means so as to provide an area of contact between said endless gripper device and the aforesaid reach, and linkages connecting said endless gripper devices for shifting of one of said gripper devices by orbital movement of one of said driving means about the other while acting as an abutment for the said one driving means, the shifting of one of said gripper devices varying the frictional engagement of said gripper devices in accordance with the loading on said belt conveyor.

9. Belt driving means for a belt conveyor having a conveying reach and a return reach comprising a pair of endless gripper devices contacting opposite surfaces of one of said reaches, means for driving said endless gripper devices with the aforesaid reach engaged therebetween comprising a pair of driving members, and linkages connecting said endless gripper devices for shifting of one of said gripper devices by orbital movement of one of said driving members about the other while acting as an abutment for the said one driving member, the shifting movement of one of said gripper devices varying the frictional engagement of said gripper devices in accordance with the loading on said belt conveyor.

10. Belt driving means for a belt conveyor having a conveying reach and a return reach comprising a pair of endless gripper devices contacting opposite surfaces of one of said reaches, means for driving said endless gripper devices with the aforesaid reach engaged therebetween, comprising meshed driving members, and linkages connecting said endless gripper devices for shifting of one of said gripper devices in a direction substantially tangential to said return reach to vary the frictional engagement of said gripper devices with the aforesaid reach in accordance with the loading of said belt conveyor.

11. Belt driving means for a belt conveyor having a conveying reach and a return reach comprising a pair of endless gripper devices contacting opposite surfaces of one of said reaches, each of said endless gripper devices having a driving sprocket and a driven sprocket spaced from each other so as to provide an area of contact between said endless gripper devices and the aforesaid reach, means for driving said sprockets together with the aforesaid reach engaged between said endless gripper devices, and means for causing said endless gripper devices to maintain contact with the aforesaid reach by substantially tangential movement of one of said gripper devices with respect thereto.

12. Belt driving means for a belt conveyor having a conveying reach and a return reach comprising a pair of endless gripper devices contacting opposite surfaces of one of said reaches, each of said endless gripper devices having spaced driving and idler means so as to provide an area of contact between said endless gripper device and the aforesaid reach, and linkages connecting said endless gripper devices for shifting of one of said gripper devices by orbital movement of one of said driving means about the other while acting as an abutment for the said one driving means, the shifting of one of said gripper devices varying the frictional engagement of said gripper devices in accordance with the loading on said belt conveyor, and manual means for shifting one of said endless gripper devices in a direction so as to release the frictional engagement thereof with the aforesaid reach.

13. Belt driving means for a belt conveyor having a conveying reach and a return reach comprising a pair of endless gripper devices contacting opposite surfaces of one of said reaches, means for driving said endless gripper devices with the aforesaid reach engaged therebetween comprising a pair of driving members, and linkages connecting said endless gripper devices for shifting of one of said gripper devices by orbital movement of one of said driving members about the other while acting as an abutment for the said one driving member, the shifting movement of one of said gripper devices varying the frictional engagement of said gripper devices in accordance with the loading on said belt conveyor, and means for shifting the shiftable gripper device in a direction so as to release the frictional engagement thereof with the aforesaid reach.

14. Belt driving means for a belt conveyor having a conveying reach and a return reach comprising a pair of endless gripper devices contacting opposite surfaces of one of said reaches, means for driving said endless gripper devices with the aforesaid reach engaged therebetween comprising meshed driving members, linkages connecting said endless gripper devices for shifting of the aforesaid one of said gripper devices in a direction substantially tangential to vary the frictional engagement of said gripper belts therewith in accordance with the loading of said belt conveyor, and means for shifting of the said one gripper device in an opposite direction so as to release the frictional engagement with the aforesaid reach.

15. Belt driving means for a belt conveyor having a conveying reach and a return reach comprising a pair of endless gripper devices contacting opposite surfaces of one of said reaches, means for driving said endless gripper devices with the aforesaid reach engaged therebetween, and linkages connecting said endless gripper devices for shifting of one of said gripper devices in a direction substantially tangential to the aforesaid reach to vary the frictional engagement of said gripper devices therewith in accordance with the loading of said belt conveyor.

No references cited.